(12) United States Patent
Adachi et al.

(10) Patent No.: US 7,027,370 B2
(45) Date of Patent: Apr. 11, 2006

(54) OPTICAL RECORDING DEVICE AND OPTICAL RECORDING METHOD, CONTROL PROGRAM FOR THE OPTICAL RECORDING DEVICE, AND COMPUTER-READABLE RECORDING MEDIUM RECORDING THE CONTROL PROGRAM

(75) Inventors: Yoshihisa Adachi, Nara (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 672 days.

(21) Appl. No.: 09/964,131

(22) Filed: Sep. 26, 2001

(65) Prior Publication Data

US 2002/0036964 A1    Mar. 28, 2002

(30) Foreign Application Priority Data

Sep. 28, 2000  (JP) .............................. 2000-297508
Aug. 31, 2001  (JP) .............................. 2001-264632

(51) Int. Cl.
    G11B 7/00  (2006.01)
(52) U.S. Cl. .................................. 369/47.53; 369/47.5
(58) Field of Classification Search ................ 369/116, 369/47.5, 47.51, 47.52, 47.53, 47.55, 121, 369/122, 47.1
    See application file for complete search history.

(56) References Cited

U.S. PATENT DOCUMENTS

| | | | |
|---|---|---|---|
| 5,974,021 A | * | 10/1999 | Toda et al. .................. 369/116 |
| 6,031,803 A | | 2/2000 | Kubota et al. ................. 369/54 |
| 6,044,049 A | | 3/2000 | Fujiune et al. ........... 369/44.29 |
| RE38,602 E | * | 9/2004 | Takahashi ................. 369/47.53 |

FOREIGN PATENT DOCUMENTS

| | | |
|---|---|---|
| JP | 08-016965 | 1/1997 |
| JP | 09-016965 | 1/1997 |
| JP | 11-003550 | 1/1999 |
| JP | 3024120 | 1/2000 |
| JP | 2000-048369 | 2/2000 |

OTHER PUBLICATIONS

Office Action for Application No. 101 47 294.3-53, German Patent Office, Oct. 17, 2002 (6pp) (with English translation) (6 pp).

* cited by examiner

Primary Examiner—Nabil Hindi
(74) Attorney, Agent, or Firm—Edwards Angell Palmer & Dodge, LLP; George W. Hartnell; David G. Conlin (57) ABSTRACT

An optical recording device includes a recording condition determining section for determining recording conditions for a track by performing test writing with respect to the track which is, for example, either a land or a groove of a magneto-optical disk, a recording condition computing section for performing computation in accordance with computation-use information based on the recording conditions for the track so as to determine recording conditions for the other track, a track switch section for switching tracks to be used for test writing, and a computation-use information managing section for correcting the computation-use information based on respective results of test writing before and after the switch, thereby determining recording conditions for one of the tracks in short time by computation, while, because the computation-use information is corrected based on the results of test writing, improving accuracy in recording conditions obtained by computation.

28 Claims, 7 Drawing Sheets

OPTICAL RECORDING DEVICE AND OPTICAL RECORDING METHOD, CONTROL PROGRAM FOR THE OPTICAL RECORDING DEVICE, AND COMPUTER-READABLE RECORDING MEDIUM RECORDING THE CONTROL PROGRAM

FIELD OF THE INVENTION

The present invention relates to an optical recording device and an optical recording method for recording information in a recording medium, and in particular to an optical recording device and an optical recording method which are capable of stably optimizing respective recording conditions for a plurality of differently characterized tracks, as well as a control program for the optical recording device and a computer-readable recording medium in which the control program is recorded.

BACKGROUND OF THE INVENTION

In recent years, research on a high-density optical disk is growing in popularity. There has been a particular problem that fluctuation in size of a record mark is caused by variation in such recording conditions as a recording light quantity of a light beam to be emitted to an optical disk, a recording magnetic field strength of an externally applied magnetic field to be applied to a magneto-optical disk, and the like, thereby preventing uniform recording and making it difficult to realize high-density recording.

Further, recording sensitivity varies for each optical disk, which is due to variation occurred during manufacture. Namely, seen from the side of an optical recording device, each optical disk shows different tendencies in terms of an optimum recording condition whereby a record mark can be formed into a proper shape and an optimum recording condition according to the position of a radius. Further, recording sensitivity is not simply unique to each optical disk but also changeable according to variation in an environmental temperature. Therefore, it is necessarily to examine optimum recording conditions for an optical recording device for each optical disk loaded and for each change in the environmental temperature. In reality, the optimum recording conditions are obtained by performing test writing with respect to a plurality of test domains, each of which has a radius in a different position.

Meanwhile, methods of further increasing a capacity of an optical disk include land-groove recording. Conventionally, recording with respect to an optical disk was performed using either a land or a groove alone. In contrast, the land-groove recording is a method in which both the land and groove are used as recording tracks so as to improve recording density.

A land-groove recording-use medium is considered to have not much difference in characteristics of recording layers because films are deposited on the land and the groove simultaneously. However, a problem is that a difference may occur in optimum recording conditions even in the case where a land and a groove adjacent to each other are compared, which is due to (i) variation in a ratio of a land width to a groove width, (ii) a difference in thermal conductivity from the land to the groove and vice versa, and (iii) others.

Against this problem are proposed solutions shown below.

First, Japanese Unexamined Patent Publication No. 16965/1997 (Tokukaihei 9-16965 published on Jan. 17, 1997) discloses a method of setting recording power in which, in test writing areas provided in both a land and a groove, test writing is performed with respect to both the land and groove, thereby setting appropriate recording power for the land and groove, respectively.

Next, the published Japanese Patent No. 3024120 (Date of Patent: Jan. 21, 2000) discloses a method of recording and reproducing optical information in which identifiers indicative of recording conditions (light intensity, track pitch, the width and depth of a groove, etc.) are provided, and a recording condition for land and that for groove are separately provided. Particularly, it is disclosed that, in order to shorten time or simplify circuitry, correlation between a land and a groove is previously obtained, thereafter obtaining a recording condition for either one of the land and the groove by performing test writing, while, for the other, a recording condition is obtained based on the correlation.

However, in the method disclosed in the above publication 16965/1997, it is a problem that, while performing test writing with respect to the both land and groove and obtaining respective optimum recording conditions, an optical recording device is required to suspend for a certain time the operation of recording or reproduction that should be performed in accordance with a user's instruction. Therefore, possible frequent occurrence of such suspension of the operation inevitably impairs a data transfer rate, namely, it impairs the performance of the optical recording device.

Further, in the method disclosed in the Japanese Patent No. 3024120, the setting of a recording light quantity is more accurate in a track on which test writing is performed than in a track for which a recording light quantity was obtained according to the correlation. Therefore, in the case where the setting of a recording light quantity is carried out more than once, the accuracy in the setting of a light quantity is likely to lose a good balance.

SUMMARY OF THE INVENTION

It is an object of the present invention to provide an optical recording device and an optical recording method which are capable of performing recording even when a plurality of tracks are differently characterized as, for example, in the case of lands and grooves, by setting an optimum recording condition for land and that for groove in short time and with superior accuracy. Further, another object of the present invention is to provide a control program to realize the optical recording device and a computer-readable recording medium in which the control program is recorded.

In order to attain the foregoing object, an optical recording device according to the present invention, which performs recording on an optical recording medium having a plurality of differently characterized tracks, includes: recording condition determining means for determining recording conditions to be used in recording with respect to at least one track selected from the tracks, by performing test writing with respect to the track thus selected; recording condition computing means for performing computation in accordance with computation-use information based on the recording condition determined by the recording condition determining means, so as to determine recording conditions to be used in recording with respect to a track other than the previously selected track; track switch means for switching tracks to be used for the test writing; and computation-use information managing means for providing the recording condition computing means with the computation-use information and correcting the computation-use information, when the track switch means switches the tracks, based on respective results of test writing before and after the switch.

Further, in order to attain the foregoing object, an optical recording method according to the present invention, which performs recording on an optical recording medium having a plurality of differently characterized tracks, includes the steps of: (i) determining recording conditions to be used in recording with respect to at least one track selected from the tracks, by performing test writing with respect to the track thus selected; (ii) performing computation in accordance with computation-use information based on the recording condition determined in the step (i), so as to determine recording conditions to be used in recording with respect to a track other than the previously selected track; (iii) switching tracks to be used for the test writing; and (iv) correcting the computation-use information, upon the switch of the tracks in the step (iii) based on respective results of test writing before and after the switch.

With the foregoing arrangement and method, in the optical recording medium having a plurality of tracks, respective recording conditions for the differently characterized tracks are determined, where the recording condition for one of the tracks (a first track) is determined by test writing, and the recording condition for the other track (a second track) is determined by performing computation in accordance with computation-use information based on results of test writing performed with respect to the first track.

Since the recording condition for one of the tracks having different recording sensitivity can be set by computation, it is possible to shorten time to set recording conditions. Therefore, it is possible to shorten time to suspend the operation of recording or reproduction that the optical recording device should perform by a user's instruction so as to obtain respective optimum recording conditions for the tracks. Consequently, it is possible to prevent reduction in the performances of the optical recording device, such as reduction in a data transfer rate.

Here, it is held that the recording conditions for a track obtained by computation in accordance with computation-use information are likely to be of inferior accuracy to the recording conditions for a track set by actually performing test writing.

Therefore, in the foregoing arrangement and method, in the case where the setting of recording conditions is carried out twice or more, tracks for test writing are switched, and, upon the switch of the tracks, the computation-use information is corrected based on results of respective test writing before and after the switch.

Namely, in the case where, in the previous setting of recording conditions, test writing was performed with respect to a first track and a recording condition for a second track is obtained by computation, then in the present setting of recording conditions after the switch, a recording condition for a track which was previously the second track is determined by test writing, and computation-use information to be used in obtaining recording conditions for the present tracks is corrected based on results of the test writing, and the results of the test writing performed with respect to the track which was previously the second track are applied to the corrected computation-use information so as to determine a recording condition for the track which was previously the first track by computation.

Accordingly, it is possible to correct the computation-use information by switching the tracks for test writing lest there should be a lack of balance in the number of test writing performances carried out in each track of the optical recording medium and/or in a state of a recording environment. Consequently, by arranging accuracy in the recording condition obtained by computation to approximate to accuracy in the recording condition obtained by test writing, it is possible to reduce the lack of balance in accuracy in the recording conditions set for the respective tracks.

Further, the foregoing arrangement and method are desirable for, for example, a multilayer recording medium having recording layers which are used as the tracks as discussed. Moreover, for example, the foregoing arrangement and method are desirable for a land-groove recording medium which is made up of a substrate provided with a guiding track including a land which is a convex portion and a groove which is the guiding track, where the land and the groove are the tracks as discussed.

Namely, an application of the foregoing arrangement and method to the multilayer recording medium having differently characterized recording layers and the land-groove recording medium having differently characterized land and groove results in an optimum setting of recording conditions for respective tracks. As a result, a recording light quantity for each track can be set with high sensitivity, thereby making it possible to increase a capacity of an optical disk.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention with reference to FIGS. 1 through 7.

Note that, in the present embodiment, explanation will be made with an example of magneto-optical recording. Further, for ease of explanation, an explanation of the optimization of recording conditions will be made through a case where the optimization of a recording light quantity in magnetic field modulation recording is performed.

Figure 2:
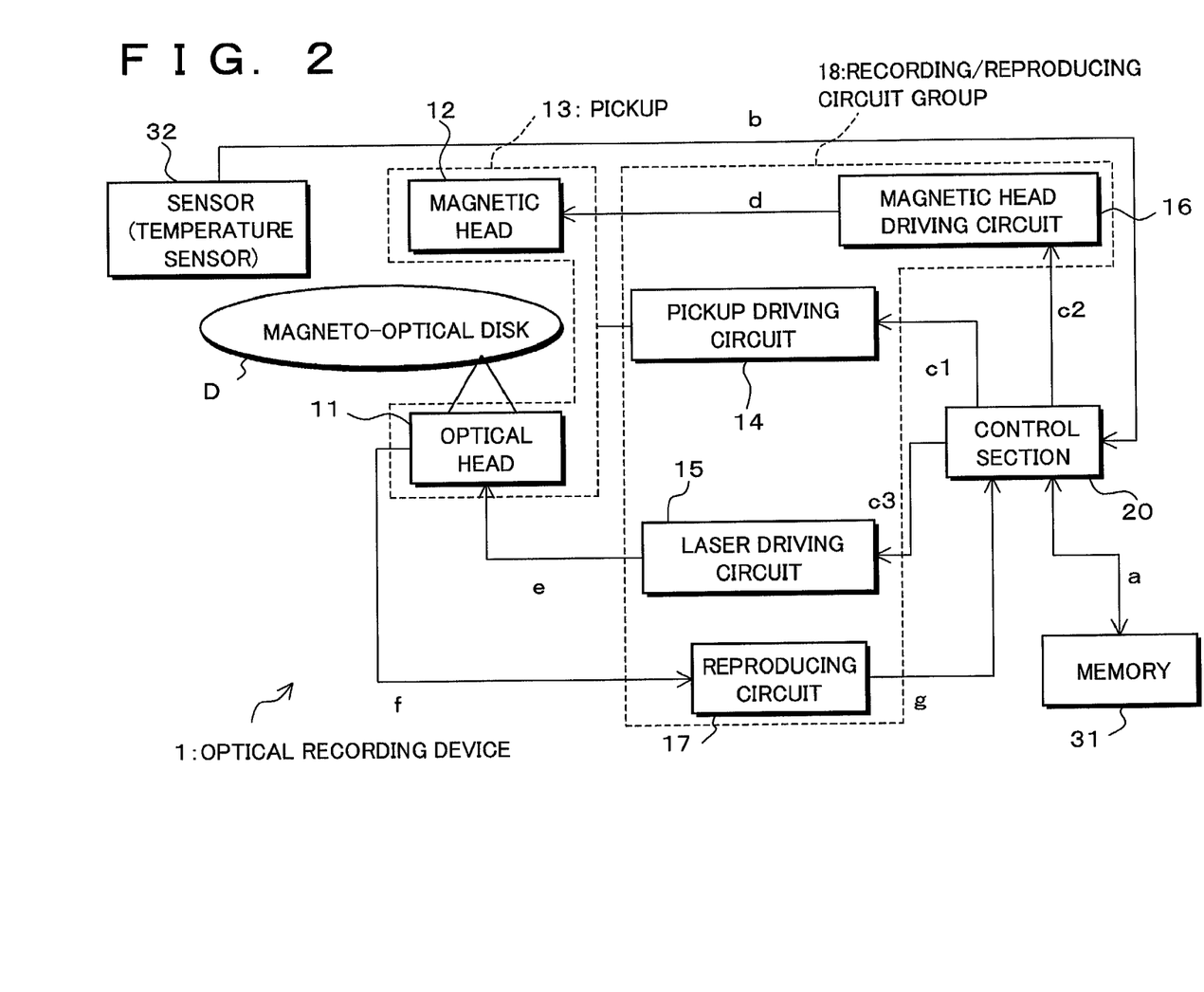
FIG. 2 is a block diagram schematically showing an arrangement of an optical recording device according to one embodiment of the present invention.

FIG. 2 is a block diagram schematically showing an arrangement of an optical recording device 1 according to the present embodiment.

A magneto-optical disk D to be loaded to the optical recording device 1 is an optical recording medium including a substrate provided with a guiding track made up of a groove which is the guiding track and a land which is a convex portion, where both the land and the groove are recording/reproducing tracks.

In the optical recording device 1, a control section 20, via a pickup driving circuit 14, causes a pickup 13 to move to a track (the land or the groove) of the rotating magneto-optical disk D. The pickup 13 is provided with an optical head 11 and a magnetic head 12. Further, the control section 20, via a laser driving circuit 15, sets a recording light quantity. Upon emission of a recording laser beam from the optical head 11 to a recording portion of the magneto-optical disk D, the control section 20, via a magnetic head driving circuit 16, causes the magnetic head 12 to generate recording magnetic field, thereby recording information in the track of the magneto-optical disk D.

Further, in the optical recording device 1, the control section 20, via the pickup driving circuit 14, causes the pickup 13 to move to the recording portion of the magneto-optical disk D. Then, the control section 20, via the laser driving circuit 15, causes the optical head 11 to emit a reproducing laser beam to the magneto-optical disk D. Reflection light that the optical head 11 sensed is converted to a reproducing signal g at a reproducing circuit 17 and inputted to the control section 20. The optical recording device 1 thus reproduces information recorded in the track of the magneto-optical disk D.

Here, the optical recording device 1 is provided particularly with a memory 31 and a sensor 32. The memory 31 is a storage device which can read/write computation-use information (to be discussed later) as data a out of/into the control section 20. Further, the sensor 32 is a sensor to sense a change in an environment of recording in the magneto-optical disk D, and for example, it is a sensor to sense temperature in the recording portion of the magneto-optical disk D. Further, a result of detection is outputted as a detection signal b to the control section 20.

As explained, the optical recording device 1 records information in the magneto-optical disk D that has two differently characterized tracks, i.e., the land and the groove. The optical recording device 1 sets a recording condition for land and that for groove based on test writing performed with respect to a test domain Db (FIG. 7) of the magneto-optical disk D, and computation-use information, respectively. Thereafter, based on the recording conditions, information is recorded in each track. Note that, the operation of recording in a user domain Da (FIG. 7) which comes after setting recording conditions in the optical recording device 1 is the same as the generally known operation.

Figure 7:
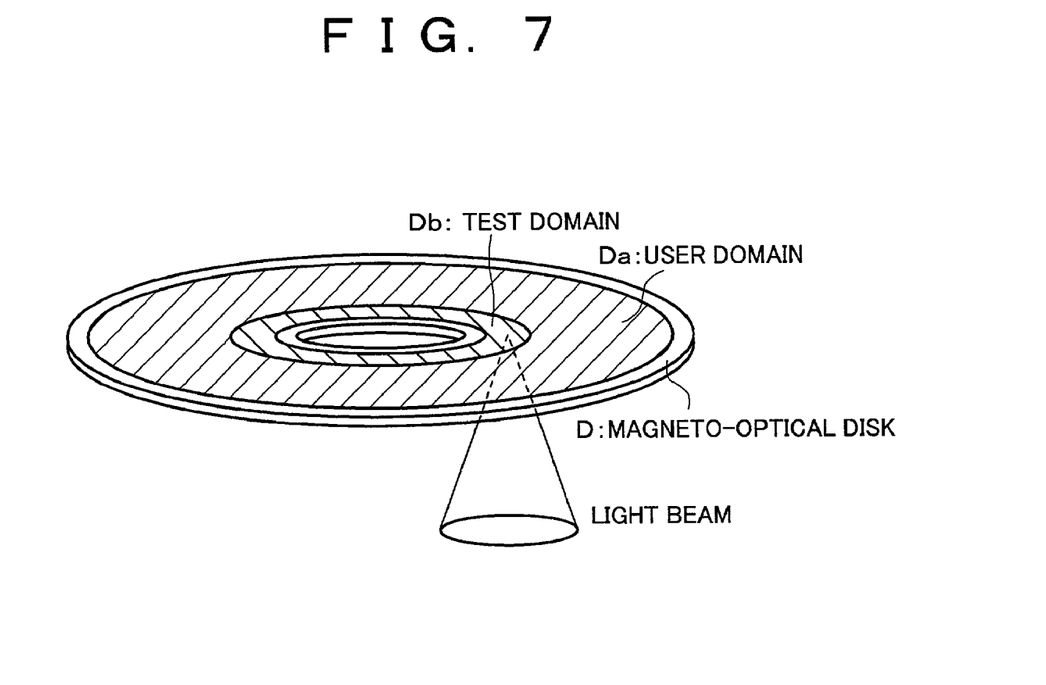
FIG. 7 is an explanatory view showing a magneto-optical disk in which the optical recording device of FIG. 2 records information.

Note that, the position of the test domain Db is not limited to the position shown in FIG. 7. The test domain Db may be located in an arbitrary radial position of the magneto-optical disk D. Alternatively, it is possible that two or more test domains Db are provided.

Next, the following will explain in detail the setting of recording conditions in the optical recording device 1, and in particular an arrangement and the operational processes.

Figure 1:
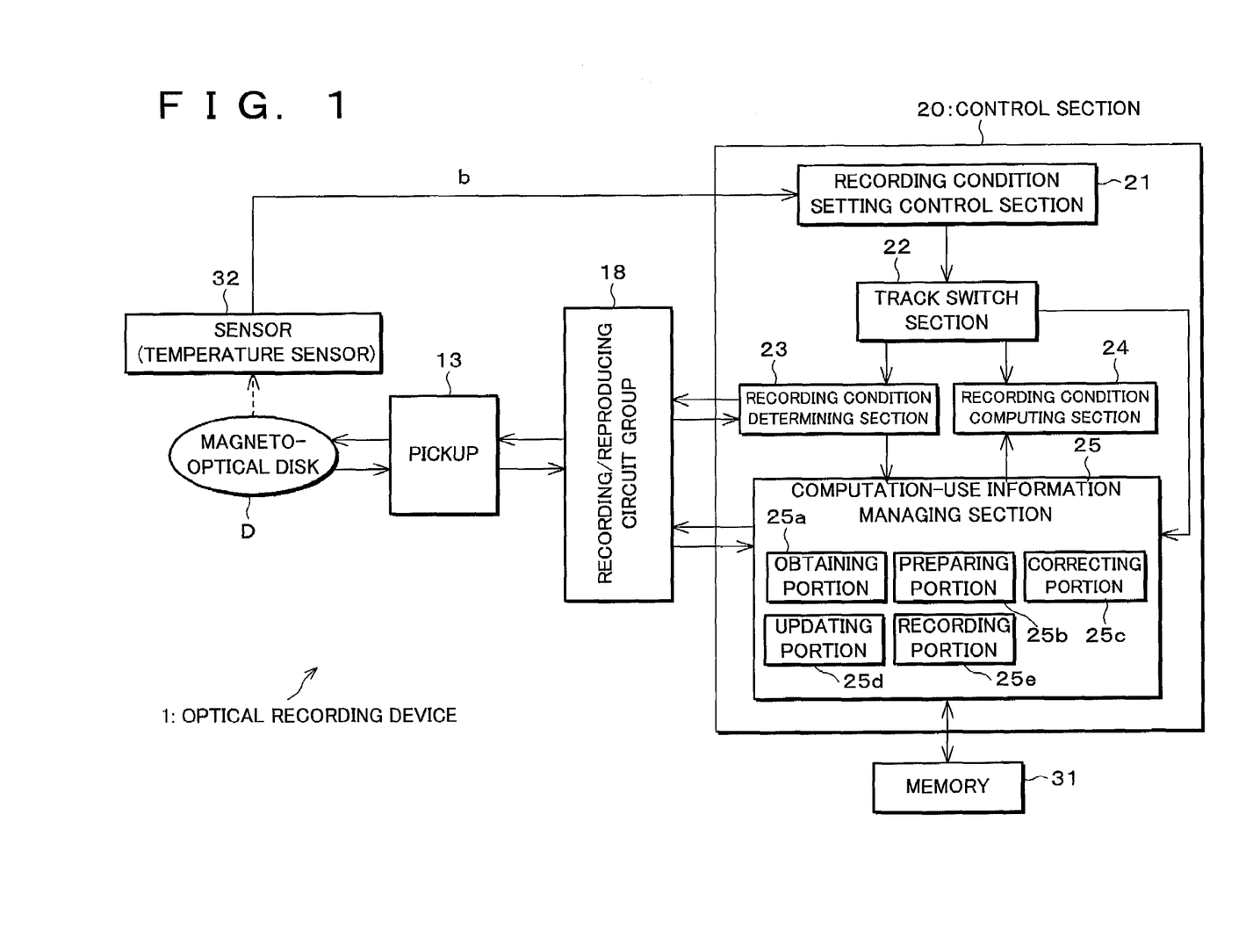
FIG. 1 is a block diagram showing an arrangement in relation to the setting of recording conditions for an optical recording device of FIG. 2.

FIG. 1 is a block diagram showing an arrangement of the control section 20 for the setting of recording conditions in the optical recording device 1.

The control section 20 is made up of a recording condition setting control section 21, a track switch section (track switch means) 22, a recording condition determining section (recording condition determining means) 23, a recording condition computing section (recording condition computing means) 24, and a computation-use information managing section (computation-use information managing means) 25.

The recording condition setting control section 21, not only when the magneto-optical disk D is loaded to the optical recording device 1 but also while performing recording of information, activates the operation of setting recording conditions as required, for example, in the case where a predetermined change in the recording environment is detected from the detection signal b of the sensor 32, or when a predetermined time elapsed after the previous test writing.

The track switch section 22 selects a track on which test writing is to be performed by the recording condition determining section 23 to determine a recording condition. Further, when determining the track for test writing, the track switch section 22 instructs the computation-use information managing section 25 to update computation-use information.

Here, in order to average degrees of accuracy in recording conditions to be set in the respective tracks, the switch of tracks is carried out lest there should be a lack of balance in the number of test writing performances carried out in each track of the magneto-optical disk D and/or a state of the recording environment. For example, a track for test writing may be selected depending on which track is used when recording is performed with respect to the user domain Da (FIG. 7). Specifically, when setting recording conditions before performing recording in a land of the user domain Da, it is possible that test writing is performed with respect to a land of the test domain Db so as to set a recording condition for land, and computation is performed with respect to a groove to determine its recording condition.

The recording condition determining section 23 performs test writing with respect to a track (a first track) selected by the track switch section 22 (hereinafter referred to as the "selected track"), thereby determining a recording condition for the selected track.

The recording condition computing section 24 performs computation with respect to a track (a second track) which was not selected at the track switch section 22 (hereinafter referred to as the "non-selected track") based on the recording condition for the selected track determined by the recording condition determining section 23, thereby determining a recording condition for the non-selected track.

The computation-use information managing section 25 keeps under its management computation-use information to be used when the recording condition computing section 24 computes a recording condition for the non-selected track, and provides the computation-use information to the recording condition computing section 24.

Here, when a recording light quantity is set, computation-use information is managed in the form of a predetermined constant or in the form of information of a reference recording light quantity regarding each of the land and the groove. The computation-use information is prepared according to correlation between tracks. Further, for example, the computation-use information may be previously recorded in the form of a predetermined constant, such as a ratio of, or difference between, recording light quantities for land and groove, respectively, in the test domain Db of the magneto-optical disk D. Alternatively, the computation-use information may be prepared by the computation-use information managing section 25 based on the information of the respective reference recording light quantities for land and groove previously recorded in the magneto-optical disk D. More specifically, when the reference recording light quantity for land and that for groove are Pw0 (L) and Pw0 (G), respectively, a ratio a $\alpha$=Pw0 (G)/Pw0 (L) or a difference APw=Pw0 (L)−Pw0 (G). The ratio, difference, or the like is thus prepared as computation-use information.

Hereafter, in the present embodiment, explanation will be made through the case where the ratio $\alpha$ of the recording light quantity for land to the recording light quantity for groove is used as computation-use information. Further, explanation will be made on the assumption that the computation-use information is recorded in the test domain Db. Nevertheless, a domain to record computation-use information can actually be anywhere over the magneto-optical disk D. Note that, computation-use information is temporarily stored in a memory 31.

Here, the computation-use information managing section 25 particularly has the following functions: (i) a function to read out computation-use information previously stored in the test domain Db of the magneto-optical disk D [an obtaining portion (obtaining means) 25$a$]; (ii) a function to prepare computation-use information based on either results of test writing performed with respect to the selected track at the recording condition determining section 23 or a recording condition determined according to the results [a preparing portion (preparing means) 25$b$]; (iii) a function to correct computation-use information for defining computing equation to be used in computing a recording condition when instructed by the track switch section 22 to switch tracks for test writing, the correction being made based on respective recording conditions according to test writing before and after the switch, of which the recording condition according to test writing before the switch is obtained either from a result of test writing immediately before the switch or from a few test writing results in the past [a correcting portion 25$c$]; (iv) a function to update computation-use information stored in the memory 31 based on the newly prepared computation-use information [an updating portion 25$d$]; and (v) a function to record the latest computation-use information stored in the memory 31 in the test domain Db of the magneto-optical disk D so that the latest computation-use information thus recorded can be read by optical recording devices other than the optical recording device 1 [a recording portion (recording means) 25$e$].

Figure 3:
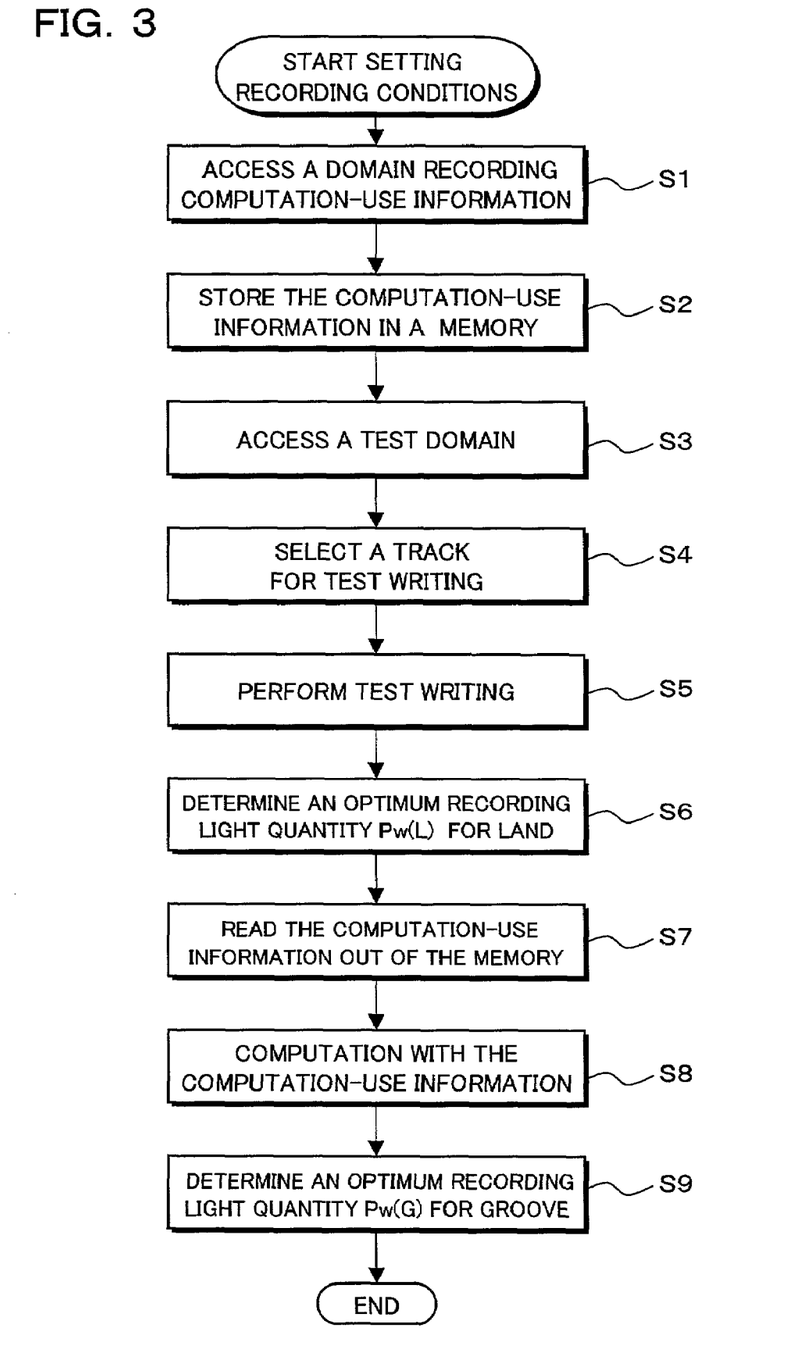
FIG. 3 is a flow chart schematically showing the operation to set recording conditions to be performed by the optical recording device of FIG. 2.

FIG. 3 is a flow chart which explains the specific operation in the setting of a recording light quantity in the optical recording device 1. The following will explain the basic operation of optimizing a recording light quantity with reference to FIG. 3.

First of all, when the magneto-optical disk D is loaded to the optical recording device 1, by the control of the computation-use information managing section 25, a domain recording the computation-use information of the test domain Db is accessed (S1), thereby reading out the computation-use information and storing it in the memory 31 (S2).

Next, by the control of the recording condition determining section 23, test writing is performed with respect to one track so as to determine an optimum recording light quantity for the track. More specifically, first, a test domain Db of the magneto-optical disk D is accessed (S3). Then, the track switch section 22 selects from land and groove a track (selected track) on which test writing is to be performed (S4). Here, it is assumed that a land is selected. Thereafter, the recording condition determining section 23 performs test writing with respect to the selected track (land) selected in step S4 (S5), thereby determining an optimum recording light quantity Pw(L) for the land Tr(L) (S6).

Next, by the control of the recording condition computing section 24, computation is performed with respect to the other track so as to determine an optimum recording light quantity for the other track. More specifically, first, the computation-use information managing section 25 reads computation-use information out of the memory 31 (S7). Then, the recording condition computing section 24 obtains through the computation-use information managing section 25 the computation-use information and the optimum recording light quantity Pw(L) for the land Tr(L) obtained in step S6 and performs computation (S8) with these, thereby determining an optimum recording light quantity Pw(G) for the groove Tr(G) (S9). Namely, using a coefficient $\alpha$ as computation-use information and the optimum recording light quantity Pw(L) for the land Tr(L), the optimum recording light quantity Pw(G) for the groove Tr(G) can be given as Pw(G)=$\alpha$×Pw(L).

Here, the operation of the optical recording device 1 in the case where the foregoing processes shown in the flow chart of FIG. 3 were performed will be explained with reference to FIG. 2.

First of all, when the magneto-optical disk D is loaded to the optical recording device 1, the control section 20 sends a control command c1 to the pickup driving circuit 14. Based on the control command c1, the pickup driving circuit 14 causes the pickup 13 to move to a domain of the magneto-optical disk D where computation-use information is recorded. The control section 20 sends a control command c3 to the laser driving circuit 15, so that a reproducing laser beam from the optical head 11 inside the pickup 13 is emitted to the magneto-optical disk D. Further, reflection light is sensed by the optical head 11 so that the reflection light thus detected is converted to an electric signal f. Thereafter, a reproducing signal g which was generated by the reproducing circuit 17 is inputted to the control section 20. The control section 20 stores the reproducing signal g as computation-use information in the memory 31.

Next, the control section 20 sends a control command c1 to the pickup driving circuit 14, thereby causing the pickup 13 to move to a test domain. Then, the control section 20 sends a control command c3 to the laser driving circuit 15 so as to set a recording light quantity, and a driving current e outputted from the laser driving circuit 15 causes a recording laser beam to be emitted from the optical head 11 to the magneto-optical disk D. Simultaneously, the control section 20 sends a control command c2 to the magnetic head driving circuit 16, thereby generating a driving current d. The driving current d causes the magnetic head 12 to generate recording magnetic field, thereby recording a test writing pattern on the magneto-optical disk D. Here, the control section 20 (the recording condition determining section 23), by controlling a control command c3, causes a recording light quantity to successively vary within a range between a small light quantity and a large light quantity. At the same time, the control section 20, by controlling a control command c1, causes the optical head 11 to move to the selected track (here, the land) while recording a test writing pattern.

Next, the control section 20 sends a control command c3 to the laser driving circuit 15 so that a reproducing laser beam is emitted from the optical head 11 to the magneto-optical disk D. The optical head 11 converts reflection light from the magneto-optical disk D to an electric signal f, thereafter providing it to the reproducing circuit 17. The reproducing circuit 17 generates a reproducing signal g for reproducing the recorded test writing pattern and outputs the reproducing signal g thus generated to the control section 20.

Further, the control section 20 (the recording condition determining section 23) successively records reproducing signals g for reproducing test writing patterns respectively corresponding to recording light quantities, and selects a recording light quantity which satisfies predetermined conditions so that the recording light quantity thus selected is determined as an optimum recording light quantity Pw(L) for land. Here, a method of detecting an optimum recording light quantity by test writing can arbitrarily be selected. For example, it is possible either to pick up a recording light quantity whereby troubles, such as error and jitter, are minimized or to pick up a recording light quantity whereby a signal amplitude shows a predetermined value.

Next, in accordance with computing equation which is determined based on computation-use information read out of the memory 31, the control section 20 (the recording condition computing section 24) performs computation to the optimum recording light quantity for land Pw(L) obtained in the above, thereby determining a recording light quantity for groove Pw(G).

Note that, the foregoing explanation has been made through the case where test writing operation (S5) is performed to determine the optimum recording light quantity Pw(L) for land Tr(L) first, which is then followed by computation to determine the optimum recording light quantity Pw(G) for groove Tr(G). However, of course, it may be also applicable that the optimum recording light quantity Pw(G) for groove Tr(G) is determined first by test writing, thereafter setting the optimum recording light quantity Pw(L) for land Tr(L) by computation. The computation in that case can be give as $Pw(L)=(1/\alpha) \times Pw(G)$.

As discussed, in the optical recording device 1, even in the case where there is a difference in recording sensitivity between a land and a groove, a recording condition for one track is determined by performing test writing, and a recording condition for the other track is determined by performing computation based on the recording condition for the track for test writing. This greatly shortens time for setting recording conditions, thereby preventing reduction in a data transfer rate due to suspension for the setting of recording conditions.

Here, it is commonly accepted that a recording condition for a track set by actually performing test writing is more accurately set than a recording condition for a track obtained by computation according to computation-use information.

Consequently, in the optical recording device 1, in the case where a recording condition is set twice or more, for example, a land is first selected at least once as a track for test writing, thereafter setting a recording light quantity for groove by computation. Next, a groove is selected at least once as a track for test writing, thereafter setting a recording light quantity for land by computation.

This enables the optical recording device 1 to greatly shorten time for setting recording conditions and reduce a lack of balance among degrees of accuracy in the recording conditions for tracks by correcting computation-use information for determining computing equation.

Figure 4:
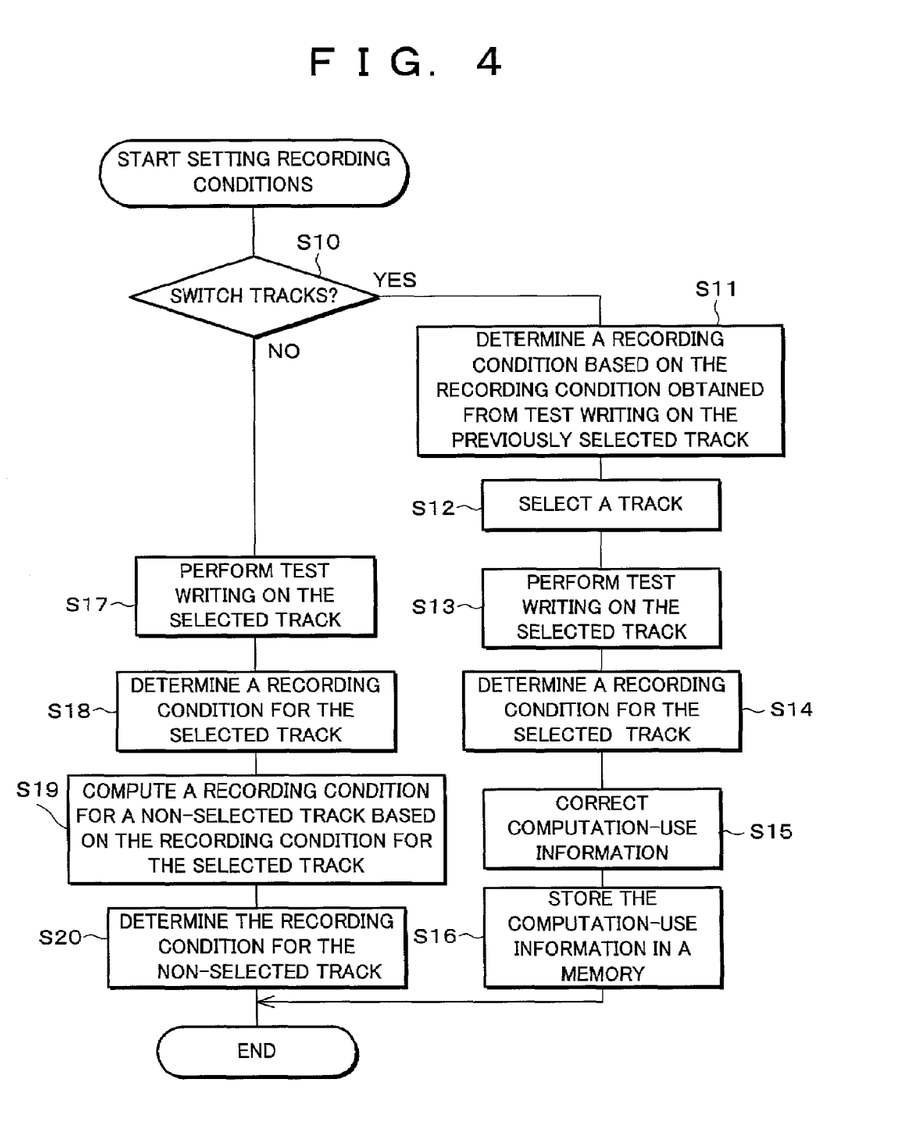
FIG. 4 is a flow chart schematically showing the operation to set recording conditions to be performed by the optical recording device of FIG. 2.

The following will explain the switch of the foregoing tracks with reference to the flow chart of FIG. 4.

Note that, in the optical recording device 1, recording conditions are set not only when the magneto-optical disk D is loaded to the optical recording device 1 but also in the following cases: when a predetermined change in an environmental temperature is sensed, when a predetermined time elapsed after the previous test writing operation, and others. Further, after loading the magneto-optical disk D to the optical recording device 1, since computation-use information is stored in the memory 31, steps S1 and S2 shown in FIG. 3 can be omitted.

As shown in FIG. 4, in the case where the recording condition setting control section 21 activates the operation of setting recording conditions in response to a detection signal b or the like from the sensor 32, then the track switch section 22 first judges whether or not tracks for test writing should be switched (S10).

Here, in the case where the track switch section 22 judges that the switch of tracks is required (YES), then the computation-use information managing section 25 reads out of the memory 31 recording conditions for the selected track before the switch. The recording conditions here include the one obtained from test writing performed immediately before, and those obtained from test writing performed a few times before to immediately before. Thereafter, the recording condition computing section 24 determines a recording condition for the selected track before the switch (S11). For example, the recording condition for the selected track before the switch according to test writing performed immediately before may be adopted. Alternatively, an anticipated recording condition may be prepared by computation based on the records of recording conditions obtained from test writing performed a few times before to immediately before. More specifically, a recording condition may be prepared by performing such interpolation as linear interpolation and second-order interpolation, and by obtaining an average value, based on the records of recording conditions obtained from test writing. Alternatively, it may be arranged that, when storing recording conditions by test writing in the memory 31, detection signals of the sensor 32 at that time are first stored by associating them with the recording conditions, and when reading out the recording conditions, a detection signal of the sensor 32 showing a value which is near a value of the current detection signal of the sensor 32 is picked up from among the detection signals stored in the memory 31, so that a recording condition associated with the detection signal thus picked up is read out for use.

Thereafter, the track switch section 22 selects a new track for test writing (S12). Next, the recording condition determining section 23 performs test writing with respect to the selected track (S13), thereby determining a recording condition for the selected track (S14). Then, using the recording condition determined in steps S11 and S14, computation-use information is corrected (S15) and housed in the memory 31 (S16).

However, in the case where the track switch section 22 judges that the switch of tracks is not required (NO), the processes from steps S3 to S9 shown in FIG. 3 are performed here. More specifically, the recording condition determining section 23 performs test writing with respect to the selected track (S17), thereby determining a recording condition for the selected track (S18). Thereafter, based on the recording condition for the selected track, the recording condition computing section 24 computes a recording condition for the non-selected track in accordance with computing equation defined by the computation-use information (S19), thereby determining the recording condition for the non-selected track (S20).

Here, in the method of setting a recording light quantity shown in FIG. 3, the computation-use information is previously recorded in the magneto-optical disk in the form of a predetermined constant or in the form of information of reference recording light quantities for land and groove, respectively.

In contrast, in the case where computation-use information is not previously recorded in the magneto-optical disk D, the optical recording device 1 prepares computation-use information by performing test writing.

Figure 5:
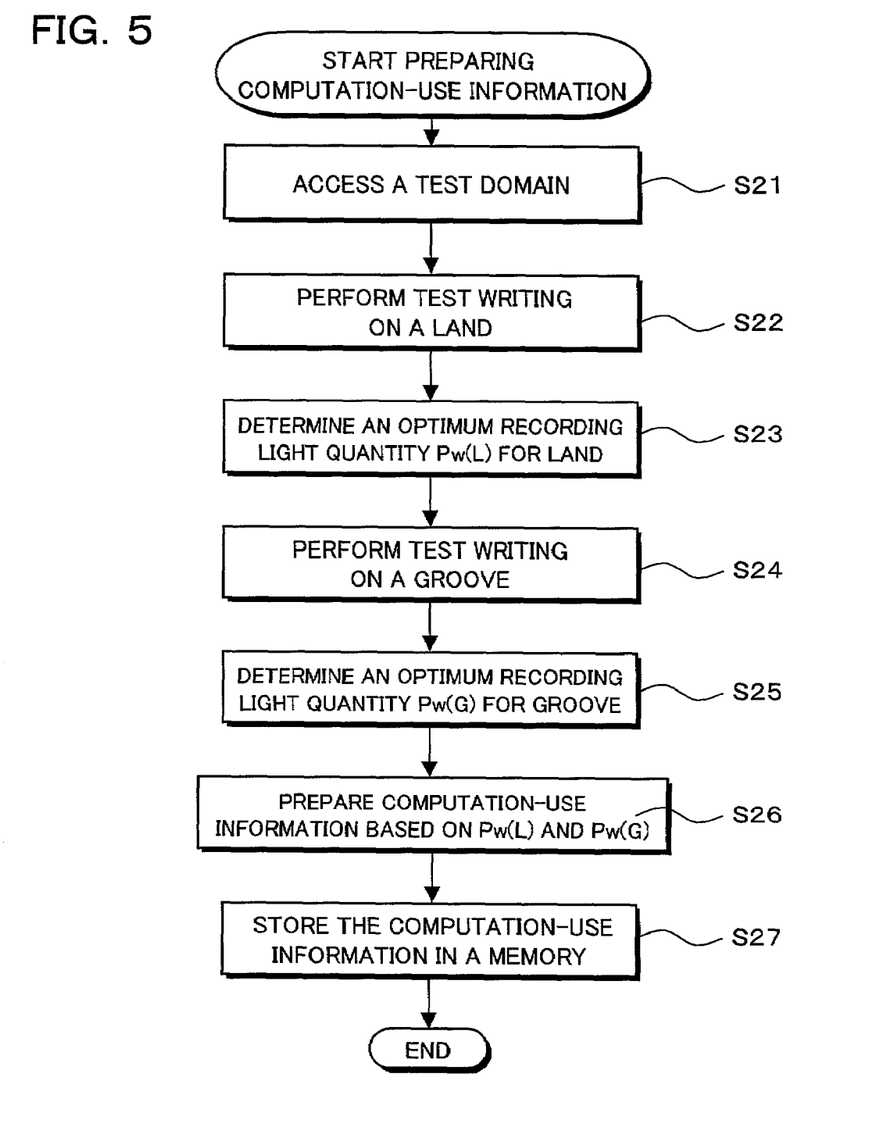
FIG. 5 is a flow chart schematically showing the operation to set recording conditions to be performed by the optical recording device of FIG. 2.

FIG. 5 is a flow chart showing the specific operation of preparing computation-use information by performing test writing.

First of all, by the control of the recording condition determining section 23, a test domain Db of the magneto-optical disk D is accessed (S21) Next, test writing is performed with respect to a land (S22), thereby determining an optimum recording light quantity Pw(L) for land Tr(L) (S23). Next, test writing is performed with respect to a groove (S24), thereby determining an optimum recording light quantity Pw(G) for groove Tr(G) (S25). Thereafter, the computation-use information managing section 25 prepares computation-use information based on the optimum recording light quantities Pw(L) and Pw(G) (S26). Finally, the computation-use information prepared in step S26 is stored in the memory 31 (S27).

of course, it is also applicable that the optimum recording light quantity Pw(G) for groove Tr(G) is determined by the test writing operation before determining the optimum recording light quantity Pw(L) for land Tr(L).

As discussed, in the optical recording device 1, in the absence of the computation-use information previously recorded in the magneto-optical disk D, computation-use information can be prepared by performing test writing and stored in the memory 31.

Accordingly, for the next time a recording condition is set, since the computation-use information is already stored in the memory 31, it is possible to set recording conditions for tracks, i.e., a land and a groove, by the operation without steps S1 and S2 of FIG. 3.

Furthermore, it is possible in the optical recording device 1 that test writing is performed at least once with respect to each of the land and the groove, and computing equation is corrected to prepare computation-use information, thereby updating computation-use information in the memory 31. Note that, a flow chart showing this operation is the same as the flow chart of FIG. 5.

Therefore, in the optical recording device 1, test writing is performed at least once with respect to each of the land and the groove so as to correct computing equation, thereby enabling the recording condition computing section 24 to determine a recording condition by computation with the more enhanced accuracy.

Further, the optical recording device 1 can record computation-use information to be used in computation of recording conditions in the magneto-optical disk D.

Figure 6:
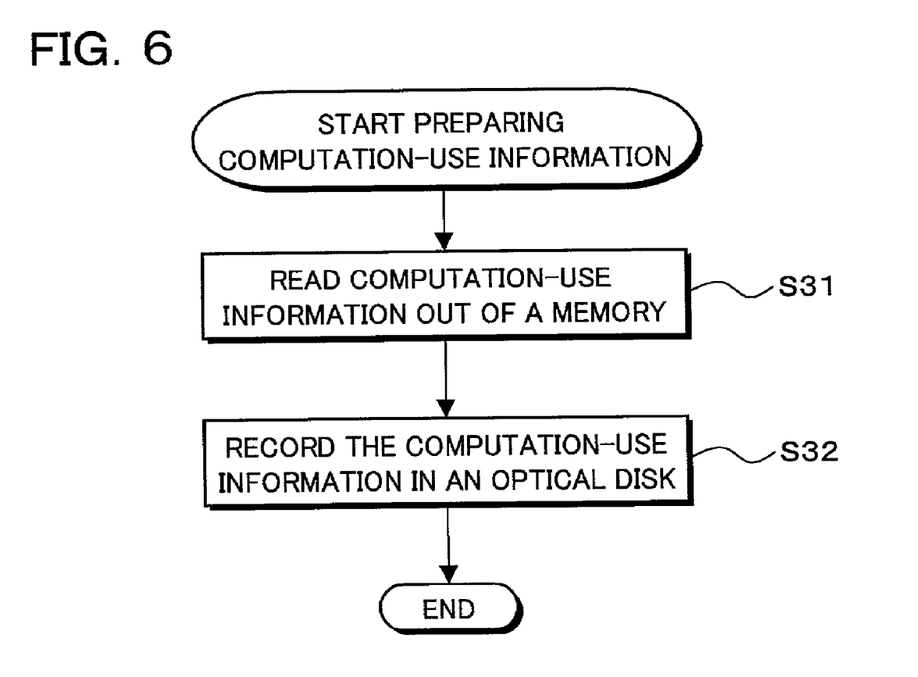
FIG. 6 is a flow chart schematically showing the operation to set recording conditions to be performed by the optical recording device of FIG. 2.

FIG. 6 is a flow chart explaining the specific operation of recording in the magneto-optical disk D the computation-use information stored in the memory 31.

First of all, by the control of the recording condition determining section 23, test writing is performed at least once with respect to each of the land and the groove so as to correct computing equation, thereby preparing new computation-use information. Then, as a result of updating the computation-use information in the memory 31, the latest computation-use information is stored in the memory 31. Therefore, the computation-use information is read out of the memory 31 (S31) so as to be recorded in the test domain Db of the magneto-optical disk D (S32).

Thus, in the optical recording device 1, recording the updated computation-use information in the magneto-optical disk D enables the latest information indicative of a characteristic difference between the land and the groove to be stored in the magneto-optical disk D. Consequently, not only a single optical recording device 1 but also different optical recording devices, to which this magneto-optical disk D is loaded to record information, can set a recording condition based on the latest computation-use information indicative of a characteristic difference between the land and the groove.

As explained, the optical recording device and the optical recording method according to the present embodiment have an arrangement in which, when the operation of determining optimum recording conditions for land and groove which have different characteristics is performed twice or more with respect to a land-groove recording medium, a track (a "first track", hereinafter) which is either a land or a groove is selected at least once or more as a track on which test writing is performed to determine an optimum recording light quantity, thus determining the optimum recording condition by test writing, and an optimum recording condition for the other track (a "second track", hereinafter) is determined by performing computation in accordance with computation-use information to the optimum recording condition obtained by test writing.

This makes it possible to set appropriate recording conditions for tracks having different recording sensitivity, by performing test writing with respect to the first track and performing computation with respect to the second track, thereby shortening time for setting recording conditions. Consequently, in the case where the land and groove have different optimum recording conditions, it is possible to shorten time to suspend the operation of recording or reproduction that the optical recording device should perform by a user's instruction so as to obtain respective optimum recording conditions for land and groove. Consequently, it is possible to prevent reduction in the performances of the optical recording device, such as reduction in a data transfer rate.

Further, the foregoing optical recording device and optical recording method have an arrangement in which, in the next operation, the second track on which test writing was not performed is selected as a track to which test writing is performed to determine an optimum recording condition, thereby determining an optimum recording condition for the second track by test writing. At the same time, based on an optimum recording condition for the first track which was determined by test writing performed previously, computation-use information to be used in the computation of the optimum recording condition for the first track is corrected. By performing computation according to the computation-use information thus corrected to the optimum recording condition for the second track by test writing, the optimum recording condition for the first track is determined.

As explained, switching tracks for test writing in the case where recording conditions are set twice or more does not allow test writing or computation to be concentrated on either one of the tracks, thus preventing lack of balance in accuracy in the setting of optimum recording conditions. Further, whenever tracks are switched, computation-use information is corrected according to results of test writing performed immediately before. This enables setting of optimum recording conditions by increasing accuracy in recording conditions obtained from computation.

Further, the foregoing optical recording device and optical recording method have an arrangement in which, when performing the operation of determining optimum recording conditions for land and groove which have different characteristics twice or more, an optimum recording condition for land and that for groove are determined by respectively performing test writing at least once or more with respect to the land and the groove, and based on the optimum recording conditions thus determined is updated information to be used in computation of optimum recording conditions.

This makes it possible to set optimum recording conditions by further increasing accuracy in recording conditions obtained from computation.

Consequently, the foregoing optical recording device and optical recording method are useful as means to perform the test writing operation in short time with respect to an optical disk which performs land-groove recording. Moreover, even in future high-density recording, conditions for light beam power can be set at high speed and with high accuracy.

Note that, the present embodiment is not to limit the scope of the present invention, and various changes are available within the scope of the present invention.

For example, explanation has been made through the case in which optimum recording light quantities are obtained with respect to a track Tr(L) of the land and a track Tr(G) of the groove among a plurality of tracks Tr of a magneto-optical recording medium. Optimum recording light quantities can of course be obtained for other tracks in the same manner. Therefore, it is preferable that setting of a recording light quantity be performed at least once for each track. However, the setting of a recording light quantity should not necessarily be performed with respect to all tracks in so far as it is performed at least once for each of the land and the groove. For example, the setting of a recording light quantity may be performed once for each group of tracks.

Further, the present embodiment is applicable to the case in which recording magnetic field strength is optimized as a recording condition to be set. Further, explanation has been made through the case in which magnetic field modulation recording is used as an example, but also in the case of optical modulation recording, a recording light quantity can be set with high sensitivity. Furthermore, the present embodiment is not limited to magneto-optical recording but is applicable to other optical recording media capable of, for example, phase change recording, and the like.

Particularly, the method explained in the present embodiment is desirably used for optical recording media having a plurality of differently characterized recording domain groups, the optical recording media including the ones capable of land-groove recording and multilayer recording. Note that, multilayer recording is a method to increase capacity of an optical disk. In this method, a difference in characteristics of a recording layer of a multilayer recording medium, or in other words, different recording sensitivity each recording layer has causes difference in optimum recording conditions. Therefore, by adopting the foregoing method, it is possible to set a recording light quantity with high sensitivity with respect to each recording layer even in the case of multilayer recording.

More specifically, in the case where the foregoing optical recording method is applied to recording to be performed on an optical recording medium having two recording layers, the land and the groove in the foregoing explanation should simply be replaced with the two recording layers.

Further, in the case where the foregoing optical recording method is applied to recording to be performed on an optical recording medium having three or more recording layers, it is possible that, in order to set a recording condition for a recording layer, test writing is performed with respect to a plurality of recording layers.

In that case, it is possible that an optimum recording condition for one of the plurality of recording layers on which test writing was performed is selected, and based on that recording condition is performed computation in accordance with computation-use information with respect to the other recording layers on which test writing was not performed, thereby determining optimum recording conditions for the respective recording layers. Further, it is also possible that among all the recording layers on which test writing was performed, optimum recording conditions for a part of or all the layers are selected, and based on the optimum recording conditions thus selected, computation in accordance with computation-use information is respectively performed with respect to the other recording layers to which test writing was not performed, thereby obtaining a plurality of recording conditions for the respective recording layers. Optimum recording conditions for the respective layers may alternatively be obtained by the application of computation, such as averaging and weighting based on the position of layers (interlayer distance), with respect to the plurality of recording conditions obtained. Further, even in the case where test writing is performed with respect to a plurality of recording layers, computation-use information among the recording layers can be updated according to the optimum recording conditions obtained by test writing.

Further, the optical recording device 1 is provided with a CPU (central processing unit) for executing a command from a program (a control program, a recording condition determining program) to attain the respective functions of the control section 20, a ROM (read only memory) storing the program, a RAM (random access memory) for loading the program, a storage device (a recording medium), such as a memory, for storing the program and various data, and others.

The object of the present invention can also be attained by providing a recording medium, which stores in a computer-readable format a program code (an execution program, an intermediate code program, a source program) of a control program which is the software to attain the foregoing functions, with respect to the optical recording medium, and allowing a computer (or the CPU or the MPU) to reading out and execute the program code recorded in the recording medium. In that case, it is the program code read out of the recording medium that realizes the foregoing functions, and the recording medium (e.g., the ROM) recording the program code makes up the present invention.

As discussed, an optical recording method according to the present invention, which records information in an optical recording medium including a plurality of differently characterized recording domain groups (tracks), may be arranged to include the steps of: (i) determining an optimum recording condition, when performing the operation of determining an optimum recording condition for each recording domain group twice or more, by selecting at least one recording domain group at least once or more as a recording domain group whose optimum recording condition is determined by test writing, while, with respect to the other recording domain groups, performing computation to the optimum recording condition obtained by test writing; and (ii) determining an optimum recording condition, in the next operation, by selecting, as a recording domain group whose optimum recording condition is determined by test writing, at least one recording domain group from the other recording domain groups, while, with respect to the other recording domain groups, performing computation to the optimum recording condition obtained by test writing.

The foregoing optical recording method may have an arrangement in which information to be used in the computation of optimum recording conditions is previously recorded in an optical recording medium.

The foregoing optical recording method may be arranged to include the step of preparing information to be used in the computation of optimum recording conditions based on optimum recording conditions for respective recording domain groups determined by test writing.

The foregoing optical recording method may be arranged to include the step of updating information to be used in the computation of optimum recording conditions based on optimum recording conditions for respective recording domain groups determined by test writing which is performed at least once or more when the operation of determining optimum recording conditions for the respective groups of recording conditions twice or more.

The foregoing optical recording method, which records information in an optical recording medium including a plurality of differently characterized recording domain groups, may be arranged to include the steps of: determining optimum recording conditions for at least one of the recording domain groups by test writing; and determining optimum recording conditions for the other recording domain groups by performing computation to the optimum recording conditions obtained by test writing.

Further, an optical recording device according to the present invention, which records information in an optical recording medium including a plurality of differently characterized recording domain groups, may be arranged to include: recording domain group switch means (a track switch section 22) for selecting by switching recording domain groups whose optimum recording condition are determined by test writing, when performing the operation of determining optimum recording conditions for respective recording domain groups; optimum recording condition setting means (a recording condition determining section 23) for determining optimum recording conditions for the recording domain groups selected by the recording domain group switch means by test writing; and optimum recording condition computing means for determining, with respect to the other recording domain groups, optimum recording conditions by performing computation to the optimum recording conditions obtained by test writing.

The foregoing optical recording device may be arranged to include computation-use information reading out means (an obtaining portion 25a of a computation-use information managing section 25) for reading out information to be used in the computation of optimum recording conditions, which is previously stored in the optical recording medium.

The foregoing optical recording device may be arranged to include computation-use information preparing means (a preparing portion 25b of the computation-use information managing section 25) for preparing information to be used in the computation of optimum recording conditions based on optimum recording conditions for respective recording domains obtained by test writing performed by the optimum recording condition setting means (the recording condition determining section 23).

The foregoing optical recording device may be arranged to include computation-use information updating means (a correcting portion 25c and an updating portion 25d, both of the computation-use information managing section 25) for updating information to be used in the computation of optimum recording conditions by determining optimum recording conditions for respective recording domain groups at least once or more, when the optimum recording condition setting means performs the operation of determining optimum recording conditions twice or more.

The foregoing optical recording device may be arranged to include recording means (a recording portion 25e of the computation-use information managing section 25) for recording newly prepared information to be used in the computation of optimum recording conditions in the optical recording medium.

The foregoing optical recording device, which records information in an optical recording medium including a plurality of differently characterized recording domain groups, may be arranged to include: optimum recording condition setting means (a recording condition determining section 23) for determining optimum recording conditions for at least one recording domain group by test writing; and optimum recording condition computing means (a recording condition computing section 24) for determining optimum recording conditions for the other recording domain groups by reading out information to be used in computation, which is recorded in the optical recording medium, and performing computation to the optimum recording conditions obtained by test writing.

The foregoing optical recording device may have an arrangement in which the plurality of differently characterized recording domain groups are a land and a groove.

The foregoing optical recording device may have an arrangement in which the plurality of differently characterized recording domain groups are a first layer track and a second layer track.

The foregoing optical recording device may have an arrangement in which the plurality of differently characterized recording domain groups are a land and a groove which are of a first layer and a second layer, respectively.

As discussed, an optical recording device according to the present invention, which performs recording on an optical recording medium having a plurality of differently characterized tracks, may have an arrangement including: recording condition determining means for determining recording conditions to be used in recording with respect to at least one track selected from the tracks, by performing test writing with respect to the track thus selected; recording condition computing means for performing computation in accordance with computation-use information based on the recording condition determined by the recording condition determining means, so as to determine recording conditions to be used in recording with respect to a track other than the previously selected track; track switch means for switching tracks to be used for the test writing; and computation-use information managing means for providing the recording condition computing means with the computation-use information and correcting the computation-use information, when the track switch means switches the tracks, based on respective results of test writing before and after the switch.

Further, an optical recording device according to the present invention may have an arrangement in which: the computation-use information managing means includes preparing means for preparing the computation-use information by performing test writing with respect to the tracks.

With this arrangement, further, the optical recording device can perform test writing with respect to a track by the preparing means, thereby preparing, based on results of test writing, computation-use information to be used in obtaining recording conditions for the track used for test writing.

Consequently, in the absence of the previously recorded computation-use information in either the optical recording device or the optical recording medium, test writing is performed to prepare computation-use information, thereby making it possible to set recording conditions.

Further, an optical recording device according to the present invention may have an arrangement in which the computation-use information managing means includes recording means for writing the computation-use information into the optical recording medium.

With this arrangement, further, the optical recording device can record the latest computation-use information in, for example, a test domain of the optical recording medium by the recording means.

Therefore, computation-use information to be used in obtaining a recording condition which is different for each optical recording medium can be recorded in each recording medium. Consequently, when recording information next, the computation-use information can be read out for use, thereby making it possible to set recording conditions with high accuracy. In addition, since the computation-use information is recorded in the recording medium, different optical recording devices can share the same computation-use information.

Further, an optical recording device according to the present invention may have an arrangement in which the computation-use information managing means includes obtaining means for reading the computation-use information out of the optical recording medium.

With this arrangement, further, the optical recording device can obtain computation-use information recorded, for example, in a test domain of the optical recording medium by the obtaining means.

Therefore, computation-use information to be used in obtaining a recording condition which is different for each optical recording medium can be recorded in each recording medium. Consequently, when recording information in the optical recording medium, recording conditions can be set with high accuracy. In addition, since the computation-use information is recorded in the recording medium, the same computation-use information can be used by an optical recording device which is different from the one which recorded the computation-use information.

Further, a control program according to the present invention is a computer program which enables a computer to function as the foregoing means.

With this arrangement, the means attributed to the foregoing optical recording device can be attained by the computer, thus attaining the foregoing optical recording device. Consequently, the foregoing optical recording device can record optimum recording conditions for a plurality of tracks in short time and with high accuracy even when the tracks have different characteristics.

Further, a computer-readable recording medium recording a control program according to the present invention is a computer-readable recording medium storing the control program that enables a computer to attain the foregoing means and thereby operates the foregoing optical recording device.

With this arrangement, the control program read out of the recording medium enables a computer to attain the foregoing optical recording device within.

Further, an optical recording device according to the present invention, which performs recording on an optical recording medium, a substrate of which is provided with a guiding track composed of a land which is a convex portion and a groove which is the guiding track, both the land and groove being recording/reproducing tracks, the optical recording device may have an arrangement which includes: recording condition determining means for determining recording conditions to be used in recording with respect to a first track which is selected from the land and the groove, by performing test writing with respect to the first track; recording condition computing means for performing computation in accordance with computation-use information based on the recording condition for the first track determined by the recording condition determining means, so as to determine recording conditions to be used in recording with respect to a second track which is a track other than the first track; track switch means for switching the land and the groove to serve as the first track; and computation-use information managing means for providing the recording condition computing means with the computation-use information and correcting the computation-use information, when the track switch means switches the tracks, based on respective results of test writing before and after the switch.

Further, an optical recording method according to the present invention, which performs recording on an optical recording medium, a substrate of which is provided with a guiding track composed of a land which is a convex portion and a groove which is the guiding track, both the land and groove being recording/reproducing tracks, the optical recording method may be arranged to include the steps of: (i) determining recording conditions to be used in recording with respect to a first track which is selected from the land and the groove, by performing test writing with respect to the first track; (ii) performing computation in accordance with computation-use information based on the recording condition for the first track determined in the step (i), so as to determine recording conditions to be used in recording with respect to a second track which is a track other than the first track; (iii) switching the land and the groove to serve as the first track; and (iv) correcting the computation-use information upon the switch of the tracks in the step (iii), based on respective results of test writing before and after the switch.

With the foregoing arrangement and method, in a land-groove recording-use medium, recording conditions for the differently characterized land and groove are determined, where the recording condition for one of the tracks (a first track) is determined by test writing, and the recording condition for the other track (a second track) is determined by performing computation in accordance with computation-use information based on results of test writing performed with respect to the first track.

Since the recording condition for one of the two tracks having different recording sensitivity can be set by computation, it is possible to shorten time to set recording conditions. Therefore, in the case where the land and groove have different recording conditions, it is possible to shorten time to suspend the operation of recording or reproduction that the optical recording device should perform by a user's instruction so as to obtain respective optimum recording conditions for land and groove. Consequently, it is possible to prevent reduction in the performances of the optical recording device, such as reduction in a data transfer rate.

Here, it is held that the recording conditions for a track obtained by computation in accordance with computation-use information are likely to be of inferior accuracy to the recording conditions for a track set by actually performing test writing.

Therefore, in the foregoing arrangement and method, in the case where the setting of recording conditions is carried out twice or more, the track for test writing is selected from the land the and groove by switching them, and, upon the switch of the tracks, the computation-use information is corrected based on results of respective test writing before and after the switch.

Namely, in the case where, in the previous setting of recording conditions, test writing was performed with respect to a land and a recording condition for groove is obtained by computation, then in the present setting of recording conditions after the switch, a recording condition for groove is determined by test writing, and computation-use information to be used in obtaining a recording condition for land is corrected based on results of the previous test writing for land, and the results of the present test writing performed with respect to the groove are applied to the corrected computation-use information so as to determine a recording condition for land by computation.

Accordingly, it is possible to correct the computation-use information by switching the tracks for test writing lest there should be a lack of balance in the number of test writing performances carried out in each track of the optical recording medium and/or in a state of a recording environment. Consequently, by arranging accuracy in the recording condition obtained by computation to approximate to accuracy in the recording condition obtained by test writing, it is possible to reduce the lack of balance in accuracy in the recording conditions set for the respective tracks.

Further, an optical recording device according to the present invention may have an arrangement in which the computation-use information managing means has preparing means for preparing the computation-use information by performing test writing with respect to the track.

With this arrangement, further, in the optical recording device, the preparing means performs test writing with respect to the track, and based on results thereof can be prepared computation-use information to be used in obtaining a recording condition for the track on which test writing was performed.

Consequently, in the absence of the previously recorded computation-use information in the optical recording device or optical recording medium, computation-use information is prepared by performing test writing, thereby making it possible to set a recording condition.

Further, an optical recording medium according to the present invention may have an arrangement in which the computation-use information managing means has recording means for writing the computation-use information into the optical recording medium.

With this arrangement, further, in the optical recording device, the latest computation-use information can be recorded, for example, in a test domain of the optical recording medium by the recording means.

Therefore, it is possible to record, in each recording medium, computation-use information to be used in obtaining a recording condition which is different for each optical recording medium. Consequently, since computation-use information can be read out for use when recording the next information, it is possible to set a recording condition with high accuracy. Further, in order to record computation-use information in a recording medium, different optical recording devices can share the same computation-use information.

Further, an optical recording device according to the present invention may have an arrangement in which the computation-use information managing means has obtaining means for reading the computation-use information out of the optical recording medium.

With this arrangement, further, in the optical recording device, computation-use information recorded, for example, in a test domain of the optical recording medium can be obtained by the obtaining means.

Therefore, computation-use information to be used in obtaining a recording condition which is different for each optical recording medium can be read out of each optical recording medium. Consequently, when information is recorded in the optical recording medium, a recording condition can be set with high accuracy. Further, since the computation-use information is recorded in a recording medium, even an optical recording device different from an optical recording device recording computation-use information can use the same computation-use information.

Further, an optical recording device according to the present invention, which performs recording on an optical recording medium, a substrate of which is provided with a guiding track composed of a land which is a convex portion and a groove which is the guiding track, both the land and groove being recording/reproducing tracks, the optical recording device may have an arrangement which includes: recording condition determining means for determining recording conditions to be used in recording with respect to a first track which is selected from the land and the groove, by performing test writing with respect to the first track; obtaining means for reading computation-use information for a second track which is a track other than the first track out of the optical recording medium; and recording condition computing means for performing computation in accordance with the computation-use information that was read out by the obtaining means based on the recording condition for the first track determined by the recording condition determining means, so as to determine recording conditions to be used in recording with respect to the second track.

Further, an optical recording method according to the present invention, which performs recording on an optical recording medium, a substrate of which is provided with a guiding track composed of a land which is a convex portion and a groove which is the guiding track, both the land and groove being recording/reproducing tracks, the optical recording method may be arranged to include the steps of: (i) determining recording conditions to be used in recording with respect to a first track which is selected from the land and the groove, by performing test writing with respect to the first track; (ii) reading computation-use information for a second track which is a track other than the first track out of the optical recording medium; and (iii) performing computation in accordance with the computation-use information that was read out in the step (ii) based on the recording condition for the first track determined in the step (i), so as to determine recording conditions to be used in recording with respect to the second track.

With the foregoing arrangement and method, in a land-groove recording-use medium, recording conditions for the differently characterized land and groove are determined, where the recording condition for one of the tracks (a first track) is determined by test writing, and the recording condition for the other track (a second track) is determined by performing computation in accordance with computation-use information based on results of test writing performed with respect to the first track.

Since the recording condition for one of the two tracks having different recording sensitivity can be set by computation, it is possible to shorten time to set recording conditions. Therefore, in the case where the land and groove have different recording conditions, it is possible to shorten time to suspend the operation of recording or reproduction that the optical recording device should perform by a user's instruction so as to obtain respective optimum recording conditions for land and groove. Consequently, it is possible to prevent reduction in the performances of the optical recording device, such as reduction in a data transfer rate.

Further, with the foregoing arrangement and method, it is possible to obtain computation-use information recorded, for example, in a test domain of the optical recording medium, which is to be used in obtaining a recording condition different for each optical recording medium. Consequently, in the case where information is recorded in the optical recording medium, a recording condition can be set with high accuracy. Further, since the computation-use information is recorded in a recording medium, even an optical recording device different from an optical recording device recording computation-use information can use the same computation-use information.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical recording device which performs recording on an optical recording medium having a plurality of differently characterized tracks, comprising:
    recording condition determining means for determining recording conditions to be used in recording with respect to at least one track selected from the tracks, by performing test writing with respect to the track thus selected;
    recording condition computing means for performing computation in accordance with computation-use information based on the recording condition determined by the recording condition determining means, so as to determine recording conditions to be used in recording with respect to a track other than the previously selected track;
    track switch means for switching tracks to be used for the test writing; and
    computation-use information managing means for providing the recording condition computing means with the computation-use information and correcting the computation-use information, when the track switch means switches the tracks, based on respective results of test writing before and after the switch.

2. The optical recording device set forth in claim 1, wherein:
    the optical recording medium is made of a substrate provided with a guiding track composed of a land which is a convex portion and a groove which is the guiding track, and the land and the groove are the tracks, respectively.

3. The optical recording device set forth in claim 2, wherein:
    the computation-use information managing means includes preparing means for preparing the computation-use information by performing test writing with respect to the tracks.

4. The optical recording device set forth in claim 2, wherein:
    the computation-use information managing means includes recording means for writing the computation-use information into the optical recording medium.

5. The optical recording device set forth in claim 2, wherein:
    the computation-use information managing means includes obtaining means for reading the computation-use information out of the optical recording medium.

6. The optical recording device set forth in claim 1, wherein:
    the optical recording medium is a multilayer recording medium having recording layers as the tracks.

7. The optical recording device set forth in claim 6, wherein:
    the computation-use information managing means includes preparing means for preparing the computation-use information by performing test writing with respect to the tracks.

8. The optical recording device set forth in claim 6, wherein:
    the computation-use information managing means includes recording means for writing the computation-use information into the optical recording medium.

9. The optical recording device set forth in claim 6, wherein:
    the computation-use information managing means includes obtaining means for reading the computation-use information out of the optical recording medium.

10. The optical recording device set forth in claim 6, wherein:
    the optical recording medium has the two recording layers.

11. The optical recording device set forth in claim 6, wherein:
    the optical recording medium has the three or more recording layers.

12. An optical recording device which performs recording on an optical recording medium, a substrate of which is provided with a guiding track composed of a land which is a convex portion and a groove which is the guiding track, both the land and groove being recording/reproducing tracks, the optical recording device comprising:
    recording condition determining means for determining recording conditions to be used in recording with respect to a first track which is selected from the land and the groove, by performing test writing with respect to the first track;
    obtaining means for reading computation-use information for a second track which is a track other than the first track out of the optical recording medium;
    track switch means for switching tracks to be used for the test writing;
    recording condition computing means for performing computation in accordance with the computation-use information read out by the obtaining means based on the recording condition for the first track determined by the recording condition determining means, so as to determine recording conditions to be used in recording with respect to the second track; and
    computation-use information managing means for providing the recording condition computing means with the computation-use information and correcting the computation-use information, when the track switch means switches the tracks, based on respective results of test writing before and after the switch.

13. An optical recording method of performing recording on an optical recording medium having a plurality of differently characterized tracks, comprising the steps of:
    (i) determining recording conditions to be used in recording with respect to at least one track selected from the tracks, by performing test writing with respect to the track thus selected;
    (ii) performing computation in accordance with computation-use information based on the recording condition determined in the step (i), so as to determine recording conditions to be used in recording with respect to a track other than the previously selected track;
    (iii) switching tracks to be used for the test writing; and (iv) correcting the computation-use information, upon the switch of the tracks in the step (iii), based on respective results of test writing before and after the switch.

14. The method set forth in claim 13, wherein:
the optical recording medium is made of a substrate provided with a guiding track composed of a land which is a convex portion and a groove which is the guiding track, and the land and the groove are the tracks, respectively.

15. The method set forth in claim 14, further comprising the step of:
preparing the computation-use information by performing test writing with respect to the tracks.

16. The method set forth in claim 14, further comprising the step of:
writing the computation-use information into the optical recording medium.

17. The method set forth in claim 14, further comprising the step of:
reading the computation-use information out of the optical recording medium.

18. The method set forth in claim 13, wherein:
the optical recording medium is a multilayer recording medium having recording layers as the tracks.

19. The method set forth in claim 18, further comprising the step of:
preparing the computation-use information by performing test writing with respect to the tracks.

20. The method set forth in claim 18, further comprising the step of:
writing the computation-use information into the optical recording medium.

21. The method set forth in claim 18, further comprising the step of:
reading the computation-use information out of the optical recording medium.

22. The method set forth in claim 18, wherein:
the optical recording medium has the two recording layers.

23. The method set forth in claim 18, wherein:
the optical recording medium has the three or more recording layers.

24. An optical recording method of performing recording on an optical recording medium, a substrate of which is provided with a guiding track composed of a land which is a convex portion and a groove which is the guiding track, both the land and groove being recording/reproducing tracks, the method comprising the steps of:
(i) determining recording conditions to be used in recording with respect to a first track which is selected from the land and the groove, by performing test writing with respect to the first track;
(ii) reading computation-use information for a second track which is a track other than the first track out of the optical recording medium;
(iii) performing computation in accordance with the computation-use information read out in the step (ii) based on the recording condition for the first track determined in the step (i), so as to determine recording conditions to be used in recording with respect to the second track;
(iv) switching tracks to be used for the test writing; and
(v) correcting the computation-use information based on respective results of test writing before and after switching of the tracks in step (iv).

25. A control program for operating the optical recording device of either one of claims 1 to 12 and enabling a computer to function as the respective means.

26. A computer-readable recording medium in which the control program of claim 25 is recorded.

27. An optical recording device which performs recording on an optical recording medium having a plurality of tracks with different recording conditions, comprising:
recording condition determining means for determining recording condition to be used in recording with respect to a first track, that is at least one track selected from the tracks, by performing test writing with respect to the first track thus selected;
obtaining means for reading out, from the optical recording medium, computation-use information that is to be created based on information of recording condition of a second track, that is a track other than the first track;
track switch means for switching tracks to be used for the test writing;
recording condition computing means for performing computation in accordance with (a) the computation-use information read out by the obtaining means and (b) the recording condition of the first track determined by the recording condition determining means, so as to determine recording condition to be used in recording with respect to the second track; and
computation-use information managing means for providing the recording condition computing means with the computation-use information and correcting the computation-use information, when the track switch means switches the tracks, based on respective results of test writing before and after the switch.

28. An optical recording method of performing recording on an optical recording medium, having a plurality of tracks with different recording conditions, the method comprising, the steps of:
(i) determining recording condition to be used in recording with respect to a first track, that is at least one track selected from the tracks, by performing test writing with respect to the first track thus selected;
(ii) reading out, from the optical recording medium, computation-use information that is to be created based on information of recording condition of a second track, that is a track other than the first track;
(iii) performing computation in accordance with (a) the computation-use information read out by the acquirement means and (b) the recording condition of the first track determined by the recording condition determining means, so as to determine recording condition to be used in recording with respect to the second track; and
computation-use information managing means for providing the recording condition computing means with the computation-use information and correcting the computation-use information, when the track switch means switches the tracks, based on respective results of test writing before and after the switch.

* * * * *